United States Patent
Ramsey et al.

(10) Patent No.: US 7,751,909 B2
(45) Date of Patent: Jul. 6, 2010

(54) TREND GROUPS AND RUNNING PROFILES IN REAL TIME ANALYTICS

(75) Inventors: Mark S. Ramsey, Kihei, HI (US); David A. Selby, Hampshire (GB); Stephen J. Todd, Hants (GB)

(73) Assignee: International Business Machines Corporation, Armonk, NY (US)

(*) Notice: Subject to any disclaimer, the term of this patent is extended or adjusted under 35 U.S.C. 154(b) by 704 days.

(21) Appl. No.: 11/609,435

(22) Filed: Dec. 12, 2006

(65) Prior Publication Data

US 2008/0141281 A1  Jun. 12, 2008

(51) Int. Cl.
 *G06F 19/00* (2006.01)
(52) U.S. Cl. .......................................... 700/34; 702/187
(58) Field of Classification Search ................... 706/53; 707/1; 702/187; 717/104; 700/90, 34
See application file for complete search history.

(56) References Cited

U.S. PATENT DOCUMENTS 6,954,883 B1 * 10/2005 Coss et al. ..................... 714/47
2005/0148388 A1 * 7/2005 Vayra et al. ................... 463/32
2007/0011479 A1 * 1/2007 Pessolano .................... 713/323

OTHER PUBLICATIONS

Cmpbell et al., A Programmable Real-Time Data Processing and Display Syste for the NOAA/ETL Doppler Radars, 1997, CIRES, University of Colorado, Boulder, Co, p. 1-4.*
Javitz et al., The SRI IDES statistic Anomaly Detector, 1991, SRI International, IEEE, p. 316-326.*

* cited by examiner

*Primary Examiner*—Kidest Bahta
(74) *Attorney, Agent, or Firm*—Anne Linne; Hoffman Warnick LLC

(57) ABSTRACT

A system. method and program product that utilizes running profiles and trend groups to analyze streams of event data in real time. A system is provided having a group profile processing system for generating a running group profile from a plurality of data event values, wherein each of the plurality of data event values is obtained from an associated one of the plurality of data streams; an event normalization system for normalizing each of the plurality of data event values based on the running group profile to generate a normalized data event value for the data event values obtained from each of the plurality of data streams; an event profile processing system for generating a running event profile for each normalized data event value; and an analysis system that evaluates each data stream by comparing a normalized data event value with an associated running event profile.

23 Claims, 1 Drawing Sheet

TREND GROUPS AND RUNNING PROFILES IN REAL TIME ANALYTICS

FIELD OF THE INVENTION

The invention relates generally to analyzing event data, and more particularly to a system and method that utilizes running profiles and trend groups to analyze streams of event data in real time.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Often, it may be necessary to examine individual data events as they occur to immediately investigate any suspect behavior. Challenges however arise when analyzing data events in real time since historical data values are typically necessary to identify trends and patterns. Namely, accessing historical data can be a relatively slow process, and thus limits real time processing.

There exist various known techniques (e.g., running estimates, moving windows, etc.) for analyzing data events in real time (or near real time). In such techniques, the historical data is essentially "built in" to the currently calculated estimate, thus providing a running statistical summary in a single value. Such techniques utilize little or no historical data to provide a statistical analysis of detected event values. Instead, they, e.g., maintain a running value, which is updated each time a new data event value is collected. New data event values can then be compared to the existing statistical summary for the associated stream of data events to identify irregularities.

In some cases, it is desired to track irregularities by comparing values in an individual data stream against a peer group of data streams. For example, all people working with a particular job in a call center should work at pretty much the same rate. Thus, productivity and trends should be similar for all employees. Accordingly, one could track (and adapt) ordinary behaviors and irregularities of the peer group as a whole, and also compare the individual entities against the peer group profile to look for irregularities.

One of the challenges is to provide a system that allows for situations where a group of entities are expected to behave in a similar overall manner, but not necessarily behave identically. For example, insurance agents or retail businesses have very different types and sizes of offices or stores; e.g., some may have a regular big turnover and others a less regular, lower turnover. However, there are overall industry trends that one would expect to apply to all similar entities. Thus, where there is a general downturn in a particular insurance segment or shopping pattern, one would not want the system to issue an "exception" (e.g., warning) for all agents or all shops. Rather, one would want the system to recognize the overall trend for the segment and compare trends of individual entities with a trend of the entire segment, e.g., identify agents whose activity has dropped even more than the industry trend, or agents who have bucked the trend.

While this type of group-based trend analysis is applied in various fields, no effective techniques exist for performing this type of analysis in real time. For example, it is common to analyze industry trends, such as in the oil segment, and then analyze individual companies within the segment. Similarly, in the stock market, it is often useful to identify a company whose stock price is on the rise when the overall industry is in a decline. However, given the need to track numerous data streams, there exist no effective real time techniques that can: (1) ascertain the overall trend (or other statistical summary) for the group; (2) ascertain trends (or other statistical summaries) for individual entities within the group; and (3) compare the individual trends against the overall trend.

SUMMARY OF THE INVENTION

The present invention addresses the above-mentioned problems, as well as others, by providing a system and method that utilizes running profiles and trend groups to analyze streams of event data in real time. As described in further detail below, a "summary" embodied in a normalized running profile is tracked for each of a plurality of entities e in a trend group. Each summary changes with time, and at any time t, just one normalized running profile is stored for each entity e. A running profile is also maintained for the trend group. An analysis system then identifies irregularities of the group against its own profile irregularities of individual entities, taking into consideration both changes to the running profile of the entity and changes to the running profile of the trend group.

In a first aspect, the invention provides a real time data event processing system for processing a plurality of data streams, comprising: a group profile processing system for generating a running group profile from a plurality of data event values, wherein each of the plurality of data event values is obtained from an associated one of the plurality of data streams; an event normalization system for normalizing each of the plurality of data event values based on the running group profile to generate a normalized data event value for the data event values obtained from each of the plurality of data streams; an event profile processing system for generating a running event profile for each normalized data event value; and an analysis system that evaluates each data stream by comparing a normalized data event value with an associated running event profile.

In a second aspect, the invention provides a computer program product stored on a computer readable medium, which when executed, processes a plurality of data streams, comprising: program code configured for generating a running group profile from a plurality of data event values, wherein each of the plurality of data event values is obtained from an associated one of the plurality of data streams; program code configured for normalizing each of the plurality of data event values based on the running group profile to generate a normalized data event value for the data event values obtained from each of the plurality of data streams; program code configured for generating a running event profile for each normalized data event value; and program code configured for evaluating each data stream.

In a third aspect, the invention provides a method for processing a plurality of data streams, comprising: generating a running group profile from a plurality of data event values, wherein each of the plurality of data event values is obtained from an associated one of the plurality of data streams; normalizing each of the plurality of data event values based on the running group profile to generate a normalized data event value for the data event values obtained from each of the plurality of data streams; generating a running event profile for each normalized data event value; and evaluating each data stream by comparing a normalized data event value with an associated running event profile.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
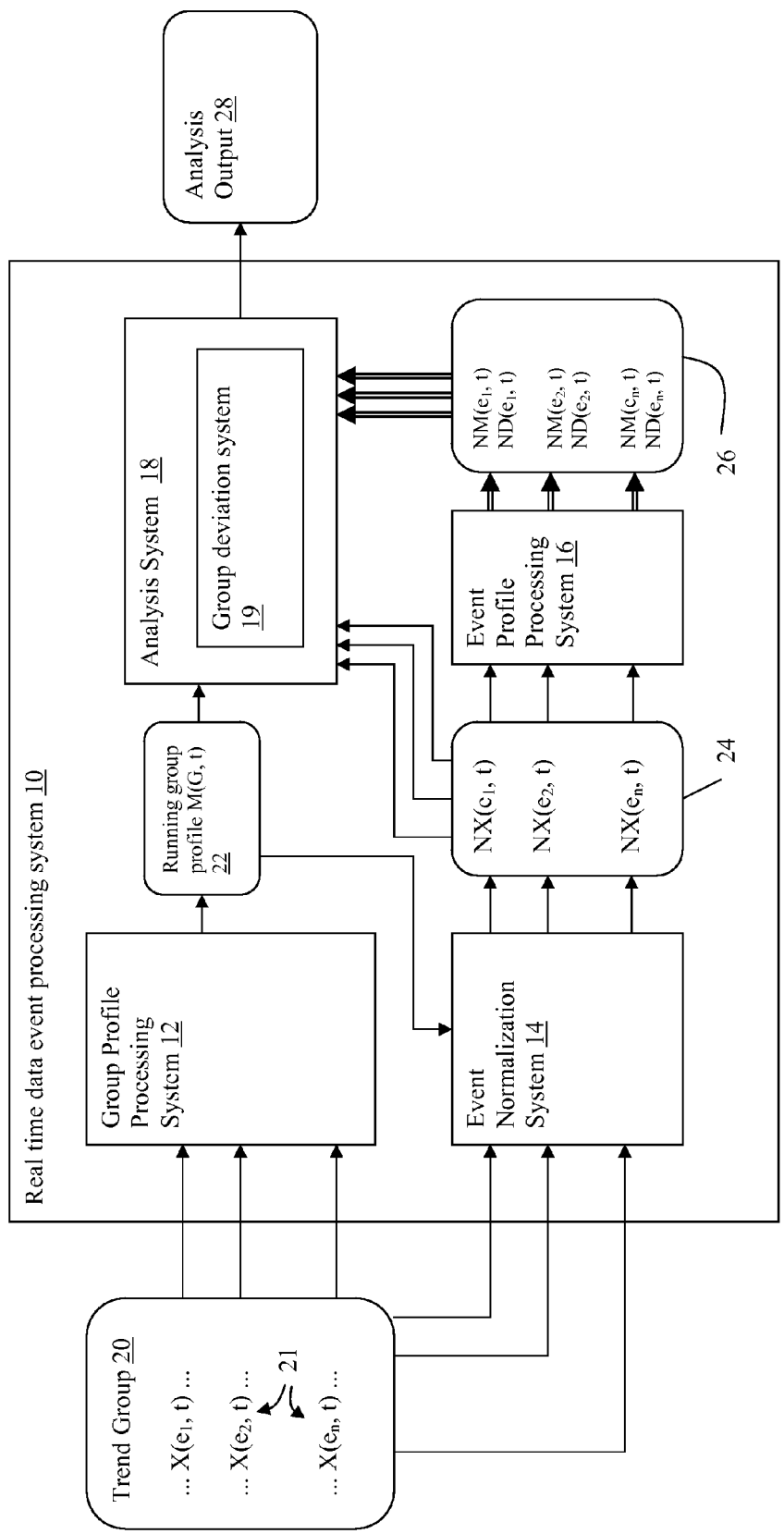
FIG. 1 depicts a real time data event processing system in accordance with an embodiment of the present invention.

FIG. 1 depicts a real time data event processing system 10 that generates running profiles of both a trend group 20 and individual data event values within the trend group 20 in order to analyze streams of data in real time. Each running profile provides a statistical summary that can be stored as a single value, or as a small set of values, thus allowing real time processing. As can be seen, trend group 20 includes a set of data streams 21, representative of data collected from a group of related entities e over time. Entities may be related in any manner, e.g., a set of stocks in a common industry, a set of workers performing a similar job role, captured behaviors of a set of consumers, performances of retail stores in a chain, credit card transactions, etc. Each stream (e.g., ... $X(e_n, t)$ ...) comprises a series of data values collected from an associated one of the entities (e.g., $e_n$), with $X(e_n, t)$ being a data value captured at current time t for entity $e_n$.

Thus, for example, real time data event processing system 10 may collect a current price for a set of related stocks every five seconds, in which case each stock is considered a separate entity e. Accordingly, for a given stock entity $e_1$, a current price at time t would be given as $X(e_1, t)$.

Each time a new set of values arrive for trend group 20, group profile processing system 12 generates a new running group profile 22, $M(G, t)$, where G refers to the trend group. In a simple case, real time data event processing system 10 processes a single trend group 20 and each entity e belongs to only one trend group. However, it is understood that the invention may encompass embodiments wherein multiple trend groups are processed, and entities may belong to a set of trend groups, e.g., arranged hierarchically or with a more general non-hierarchical relationship between entities and groups.

Running group profile 22 is calculated based on: (1) the set of data event values collected at time t for the trend group 20; and (2) a previously calculated running group profile, e.g., $M(G, t-1)$. For example, each of the current event values $X(e_1, t), X(e_2, t) \ldots X(e_n, t)$ could be averaged or otherwise reduced into a single value, and then combined with the previously calculated running group profile $M(G, t-1)$ using, e.g., a running median algorithm, to generate a new running group profile $M(G, t)$. Alternatively, each of the values $X(e, t)$ may be applied to $M(G, t)$ individually. Further, events may arrive at irregular times, with events for different entities in the group arriving at different times. In this case the individual events may be applied to $M(G, t)$ as each event arrives, using appropriate time based running update rules to maintain $M(G, t)$. It is understood that any technique or algorithm for generating and maintaining a running group profile 22 could be utilized by group profile processing system 12. Such algorithms are discussed below with regard to event profile processing system 16.

Once the running group profile 22 is calculated, event normalization system 14 normalizes each of the current data event values for trend group 20 using the running group profile 22. The result is a set normalized data event values 24, $NX(e_1, t), NX(e_2, t) \ldots NX(e_n, t)$. Normalization may be done in any manner. In one illustrative embodiment, a normalized value for event e is calculated as follows:

$$NX(e,t)=X(e,t)/M(G,t).$$

In this case, division is used to normalize data event values; however, in some cases such as where values have a logarithmic distribution, subtraction may be more appropriate.

Once the set normalized data event values 24 are generated, event profile processing system 16 generates a set of running event profiles 26 from the normalized data event values 24. Similar to the running group profile discussed above, each running event profile, e.g., $NM(e_1, t)$, is calculated based on: (1) a current normalized data event value, e.g., $NX(e_1, t)$; and (2) a previously calculated running event profile, e.g., $NM(e_1, t-1)$.

Any type of algorithm can be utilized to generate the running event profiles. Examples include, but are not limited to, a running median, a running mean, a hybrid of a running median and running mean, a middle filter, exponential smoothing, complex exponential smoothing, etc. For example, a new running event profile $P_n$ can be calculated according to the general form: $P_n=P_{n-1}+(1-k)*F(E_n-P_{n-1})$, where k is a damping factor, $E_n$ is a current data event value, $P_{n-1}$ is a previously calculated running event profile, and F is any function, e.g., a function that simply takes a difference, generates 1, 0 or −1 based on the difference, etc.

Another illustrative algorithm for calculating a running profile $P_n$ can be calculated according to the general form: $P_n=(1-K)*DV+K*P_{n-1}$, where DV is a difference between a current data event value and a previous data event value and K is a half-life based smoothing factor that can be selected in any manner. A running standard deviation RSD can be further calculated according to the equation: $RSD=sqrt(RDVV_n-RDV^2)$, where $RDVV_n=(1-K)*DV^2+K*RDVV_{n-1}$.

In the example shown in FIG. 1, event running profile processing system 16 generates a middle value $NM(e, t)$ and a deviation value $ND(e, t)$ for each normalized event value $NX(e, t)$. In other cases, only a single value, e.g., $NM(e, t)$ might be generated, while in still other cases, three or more values might be generated, e.g., a set of percentiles or histogram.

Once all the information is generated, analysis system 18 is utilized to compare each normalized data event value $NX(e, t)$ against its associated profile, e.g., $NM(e, t), ND(e, t)$. Thus, in the embodiment of FIG. 1, analysis system 18 would compare: $NX(e_1, t)$ against $NM(e_1, t), ND(e_1, t); NX(e_2, t)$ against $NM(e_2, t), ND(e_2, t)$; etc. In an alternative embodiment, each normalized data event could be compared against its previously calculated profile, e.g., $NM(e, t-1), ND(e, t-1)$. In addition, the running group profile $M(G, t)$ could be compared to the previously calculated group profile $M(G, t-1)$ to provide an overall group analysis. Based on the results of the analysis, analysis output 28 would be generated. Analysis system 18 might for example include exception detection logic that generates an exception or warning when the result of one or more of the compare operations exceeds a predetermined threshold. In another example, exception detection logic may generate an exception when a difference between a normalized data event value and an associated running event profile exceeds a factor of N times a normalized running standard deviation, wherein N is any predetermined value.

Obviously, other type of analysis could be utilized, e.g., comparing calculated profiles to predetermined values, additional historical values, etc.

Note that there may be cases variations in deviation of the group need to be considered in the exception detection logic. In this case, group deviation system 19 could be employed to track extra data, such as un-normalized profile information, and then utilize more complex logic to account for such deviation.

In general, real time data event processing system 10 may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time data event processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A real time data event processing system for processing a plurality of data streams, comprising:
   at least one computer device including:
   a group profile processing system for generating a running group profile from a plurality of data event values, wherein each of the plurality of data event values is obtained from an associated one of the plurality of data streams;
   an event normalization system for normalizing each of the plurality of data event values based on the running group profile to generate a normalized data event value for the data event values obtained from each of the plurality of data streams;
   an event profile processing system for generating a running event profile for each normalized data event value;
   an analysis system that evaluates each data stream by comparing a normalized data event value with an associated running event profile; and
   an outputting system for outputting a result of the evaluation.

2. The real time data event processing system of claim 1, wherein the running group profile is calculated based on a previously calculated running group profile.

3. The real time data event processing system of claim 1, wherein each running event profile is calculated based on a normalized data event value and a previously calculated running event profile.

4. The real time data event processing system of claim 3, wherein each running event profile is calculated using an algorithm selected from the group consisting of: a running median, a running mean, a hybrid of a running median and running mean, a middle filter, an exponential smoothing algorithm, and a complex exponential smoothing algorithm.

5. The real time data event processing system of claim 3, wherein each running event profile includes a plurality of values including a value selected from the group consisting of: a percentile and a standard deviation.

6. The real time data event processing system of claim 1, wherein the event normalization system calculates a normalized data event value NX(e, t) for a data stream e at a time t according to the equation:

$$NX(e,t)=X(e,t)/M(G,t),$$

wherein X(e, t) is a data event value for data stream e at time t and M(G, t) is a running group profile value for a group G of data events at time t for a plurality of data streams.

7. The real time data event processing system of claim 1, wherein the analysis system includes exception detection logic that generates an exception when a difference between a normalized data event value and an associated running event profile exceeds a predetermined threshold.

8. The real time data event processing system of claim 1, wherein the analysis system includes exception detection logic that generates an exception when a difference between a normalized data event value and an associated running event profile exceeds a factor of N times a normalized running standard deviation, wherein N is a predetermined value.

9. A computer program product stored on a computer readable storage medium, which when executed, processes a plurality of data streams, comprising:
program code for generating a running group profile from a plurality of data event values, wherein each of the plurality of data event values is obtained from an associated one of the plurality of data streams;
program code for normalizing each of the plurality of data event values based on the running group profile to generate a normalized data event value for the data event values obtained from each of the plurality of data streams;
program code for generating a running event profile for each normalized data event value;
program code for evaluating each data stream; and
program code for outputting a result of the evaluation.

10. The computer program product of claim 9, wherein the running group profile is calculated based on a previously calculated running group profile.

11. The computer program product of claim 9, wherein each running event profile is calculated based on a normalized data event value and a previously calculated running event profile.

12. The computer program product of claim 11, wherein each running event profile is calculated using an algorithm selected from the group consisting of: a running median, a running mean, a hybrid of a running median and running mean, a middle filter, an exponential smoothing algorithm, and a complex exponential smoothing algorithm.

13. The computer program product of claim 11, wherein each running event profile includes a plurality of values including a value selected from the group consisting of: a percentile and a standard deviation.

14. The computer program product of claim 9, wherein each normalized data event value NX(e, t) for a data stream e at a time t is calculated according to the equation:

$$NX(e,t)=X(e,t)/M(G,t),$$

wherein X(e, t) is a data event value for data stream e at time t and M(G, t) is a running group profile value for a group G of data events at time t for a plurality of data streams.

15. The computer program product of claim 9, wherein the data stream is evaluated by comparing a normalized data event value with an associated running event profile.

16. The computer program product of claim 9, wherein the data stream is evaluated by determining if a difference between a normalized data event value and an associated running event profile exceeds a factor of N times a normalized running standard deviation, wherein N is a predetermined value.

17. A computer-implemented method of processing a plurality of data streams, comprising:
generating a running group profile from a plurality of data event values, wherein each of the plurality of data event values is obtained from an associated one of the plurality of data streams;
normalizing each of the plurality of data event values based on the running group profile to generate a normalized data event value for the data event values obtained from each of the plurality of data streams;
generating a running event profile and for each normalized data event value;
evaluating each data stream by comparing a normalized data event value with an associated running event profile utilizing a computer for outputting a result of the evaluating.

18. The method of claim 17, wherein the running group profile is calculated based on a previously calculated running group profile.

19. The method of claim 17, wherein each running event profile is calculated based on a normalized data event value and a previously calculated running event profile.

20. The method of claim 19, wherein each running event profile is calculated using an algorithm selected from the group consisting of: a running median, a running mean, a hybrid of a running median and running mean, a middle filter, an exponential smoothing algorithm, and a complex exponential smoothing algorithm.

21. The method of claim 19, wherein each running event profile includes a plurality of values including a value selected from the group consisting of: a percentile and a standard deviation.

22. The method of claim 17, wherein each normalized data event value NX(e, t) for a data stream e at a time t is calculated according to the equation:

$$NX(e,t)=X(e,t)/M(G,t),$$

wherein X(e, t) is a data event value for data stream e at time t and M(G, t) is a running group profile value for a group G of data events at time t for a plurality of data streams.

23. The method of claim 17, further comprising evaluating each data stream by determining if a difference between a normalized data event value and an associated running event profile exceeds a factor of N times a normalized running standard deviation, wherein N is a predetermined value.

* * * * *